United States Patent
Tramoni

(10) Patent No.: US 9,367,784 B2
(45) Date of Patent: Jun. 14, 2016

(54) POWER MANAGEMENT IN AN ELECTROMAGNETIC TRANSPONDER

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 37 days.

(21) Appl. No.: 14/406,479

(22) PCT Filed: Jun. 11, 2013

(86) PCT No.: PCT/FR2013/051349
§ 371 (c)(1),
(2) Date: Dec. 8, 2014

(87) PCT Pub. No.: WO2013/186478
PCT Pub. Date: Dec. 19, 2013

(65) Prior Publication Data
US 2015/0137953 A1    May 21, 2015

(30) Foreign Application Priority Data

Jun. 13, 2012  (FR) ...................................... 12 55525

(51) Int. Cl.
*G06K 19/07* (2006.01)
*G06K 19/077* (2006.01)

(52) U.S. Cl.
CPC ........ *G06K 19/0705* (2013.01); *G06K 19/0701* (2013.01); *G06K 19/0702* (2013.01); *G06K 19/0709* (2013.01); *G06K 19/07749* (2013.01)

(58) Field of Classification Search
CPC . H04Q 5/22; G06K 19/0705; G06K 19/0709; G06K 19/07749
USPC .................. 340/572.8, 505, 572.1, 572.2, 340/10.1–10.6
See application file for complete search history.

(56) References Cited

U.S. PATENT DOCUMENTS

| | | | | |
|---|---|---|---|---|
| 5,864,302 A * | 1/1999 | Kokubu | .................. | B60R 25/00 340/10.5 |
| 6,134,130 A | 10/2000 | Connell et al. | | |
| 6,525,410 B1 * | 2/2003 | Gelsomini | ........ | G06K 19/07749 257/664 |
| 6,529,127 B2 * | 3/2003 | Townsend | ............. | G01L 1/2256 340/10.1 |
| 6,636,146 B1 * | 10/2003 | Wehoski | ............ | G06K 7/10336 340/10.4 |
| 6,778,070 B1 * | 8/2004 | Thomas | ............. | G06K 19/0723 340/10.1 |
| 7,564,340 B2 * | 7/2009 | Kowalski | ......... | G06K 19/07786 340/10.1 |
| 8,497,763 B2 * | 7/2013 | Sawada | ................ | G06K 7/0008 340/10.1 |
| 8,754,753 B2 * | 6/2014 | Enguent | ............ | G06K 19/0723 340/10.1 |
| 8,922,338 B2 * | 12/2014 | Wuidart | ............ | G06K 19/0707 340/10.1 |
| 2006/0132289 A1 | 6/2006 | Conraux | | |
| 2007/0013524 A1 * | 1/2007 | Ganz | .................. | G06K 19/0723 340/572.7 |
| 2009/0179761 A1 * | 7/2009 | Chang | ....................... | G06F 1/32 340/572.1 |
| 2010/0291870 A1 | 11/2010 | Butler | | |
| 2010/0291871 A1 | 11/2010 | Butler | | |
| 2012/0149443 A1 * | 6/2012 | Wuidart | ........... | G06K 19/07345 455/572 |
| 2012/0312880 A1 * | 12/2012 | Ochoa | ................ | G06K 19/0715 235/492 |

* cited by examiner

*Primary Examiner* — Allen T Cao
(74) *Attorney, Agent, or Firm* — Seed IP Law Group PLLC

(57) ABSTRACT

An electromagnetic transponder includes an oscillatory circuit, a battery and a first rectifier bridge. Alternating current input terminals of the rectifier bridge are connected to the terminals of the oscillatory circuit, and at least two rectifier elements of the rectifier bridge are controllable on the basis of the voltage supplied by the battery.

18 Claims, 3 Drawing Sheets

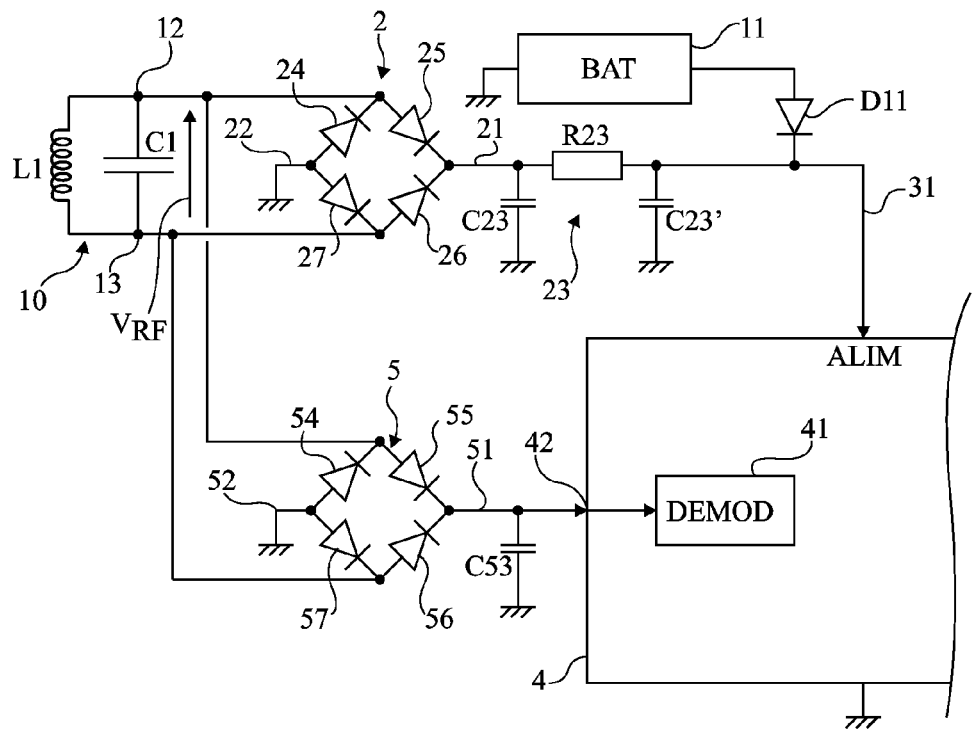
Fig 1
(Prior Art)
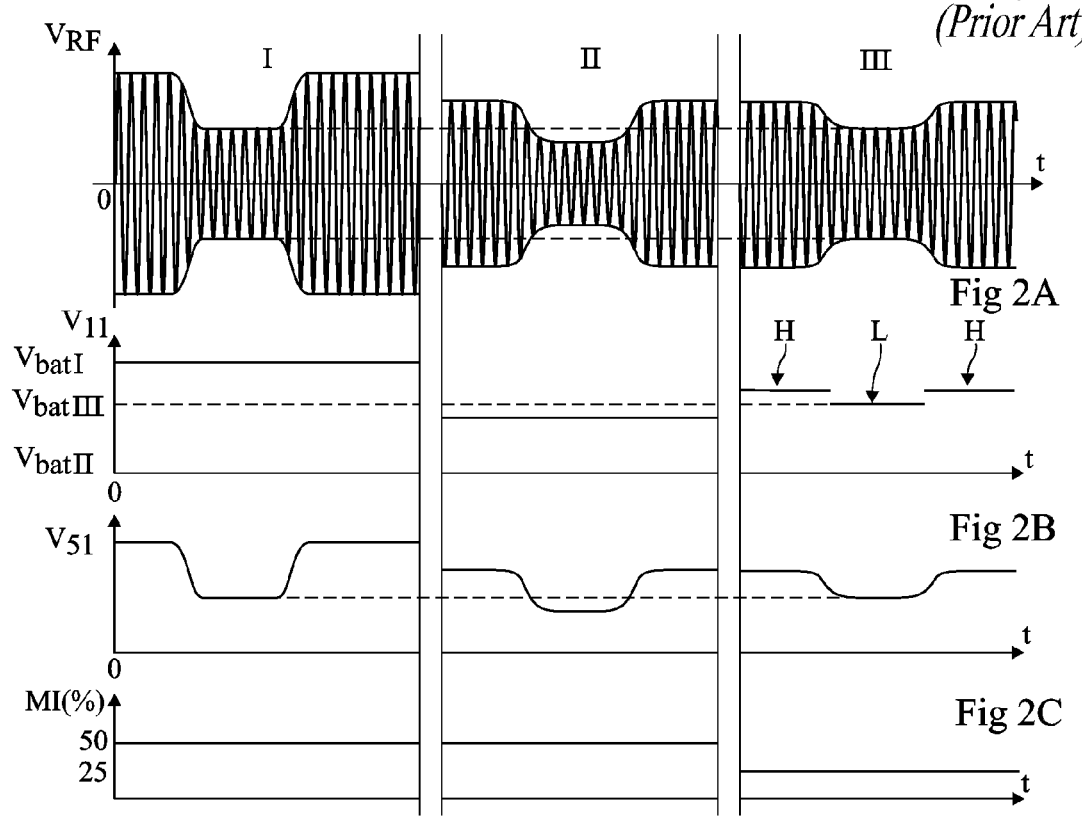
Fig 2A
Fig 2B
Fig 2C
Fig 2D

POWER MANAGEMENT IN AN ELECTROMAGNETIC TRANSPONDER

BACKGROUND

1. Technical Field

The present disclosure generally relates to electronic circuits and, more specifically, to electromagnetic transponders equipped with a battery.

A field of application of the present invention relates to so-called NFC (Near Field Communication) devices, which are most often mobile telecommunication devices equipped with near-field communication circuits.

2. Description of the Related Art

Most devices provided with a battery and with a near-field communication router are designed to be powered by the battery when available or to be remotely supplied by extracting power from an electromagnetic field radiated by a terminal in the absence of a battery or when said battery is not available or discharged.

A transmission from a terminal to a transponder is generally performed in amplitude modulation of a high-frequency carrier (for example, at 13.56 MHz). Since the carrier must be able to supply power to the transponder when it is not powered by its battery, the modulation index is generally smaller than 100% so that the carrier is always present.

The modulation index is defined as being the ratio of the variation of the message amplitude to the variation of the carrier amplitude. In practice, the modulation index generally is 0.8, which means that the difference between the respective amplitudes of a high state and of a low state does not exceed 20% of the carrier amplitude. This modulation index conditions the sensitivity necessary for the demodulator on the transponder side so that said transponder can make out high-state transmissions from low-state transmissions.

Problems may arise when the charge of the transponder battery is at a level such that the transponder attempts to draw power from the electromagnetic field during high levels of the transmission and to draw power from the battery during low levels. In such a case, the modulation index is no longer respected, which may cause signal interpretation errors.

BRIEF SUMMARY

Thus, an embodiment of the present invention aims at overcoming all or part of the disadvantages of usual electromagnetic transponders equipped with a battery.

An embodiment of the present invention aims at preserving the modulation index of the terminal, whether the transponder operates in battery mode or in remote-supply mode.

An embodiment of the present invention aims at simplifying the switching from one mode to the other.

An embodiment of the present invention aims at providing a solution which can be easily integrated in low-voltage technology.

To achieve all or part of these and other objects, the present invention provides an electromagnetic transponder comprising:

an oscillating circuit;

a battery; and a first rectifying bridge having A.C. input terminals connected across the oscillating circuit and having at least two rectifying elements controllable with the voltage supplied by the battery.

According to an embodiment of the present invention, the transponder further comprises a second rectifying bridge having an output connected to the input of an amplitude demodulator.

According to an embodiment of the present invention, said two controllable rectifying elements are two first MOS transistors.

According to an embodiment of the present invention, the gate of each first MOS transistor is connected to the junction point of a series association of a resistive element and of a second MOS transistor between one of the A.C. input terminals of the first rectifying bridge and a reference potential.

According to an embodiment of the present invention, each second transistor receives, on its gate, a voltage representative of the battery charge level.

According to an embodiment of the present invention, said representative voltage is the voltage supplied by the battery.

According to an embodiment of the present invention, the transponder comprises a comparator of the level of the battery voltage with a threshold for controlling the first rectifying bridge.

BRIEF DESCRIPTION OF THE SEVERAL VIEWS OF THE DRAWINGS

The foregoing and other features and advantages of the present invention will be discussed in detail in the following non-limiting description of specific embodiments in connection with the accompanying drawings, among which:

FIG. 1 is a partial simplified representation of an example of a usual electromagnetic transponder;

FIGS. 2A, 2B, 2C, and 2D illustrate, in the form of timing diagrams, the operation of the transponder of FIG. 1;

DETAILED DESCRIPTION

Figure 3:
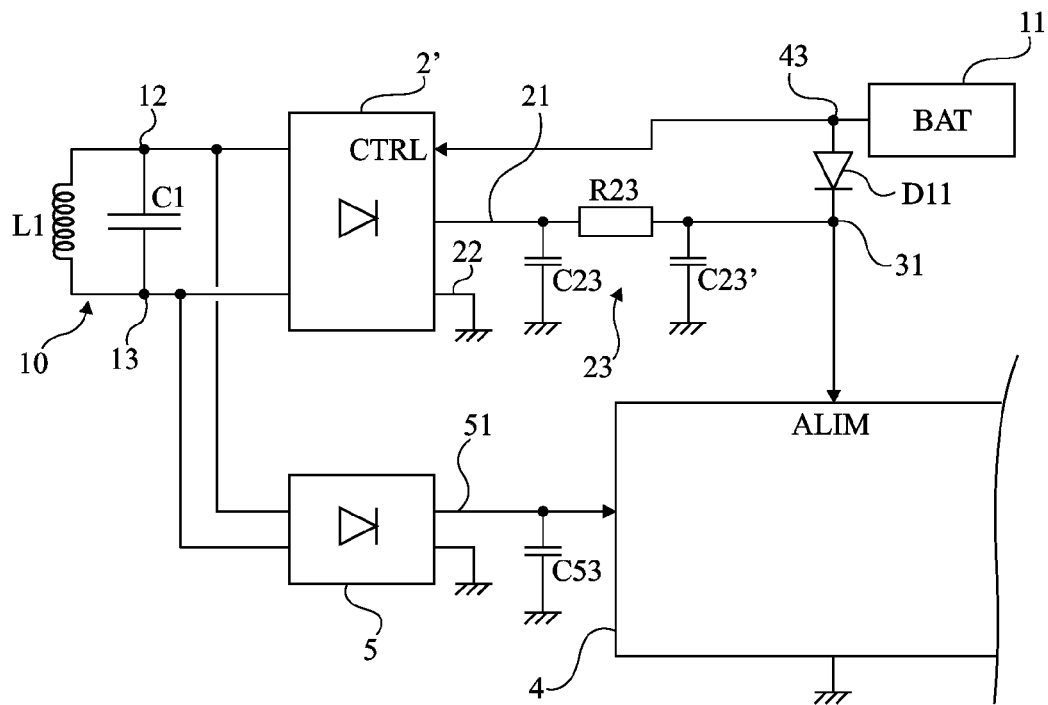
FIG. 3 is a simplified electric diagram of an embodiment of an electromagnetic transponder.

The same elements have been designated with the same reference numerals in the different drawings. For clarity, only those elements which are useful to the understanding of the embodiments which will be described have been shown and will be detailed. In particular, the generation of the signals to be transmitted by a terminal has not been detailed, the described embodiments being compatible with usual transmissions. Further, circuits for using the signals received by the transponder have not been detailed either, the described embodiments being here again compatible with the current use of such transmissions.

FIG. 1 very schematically shows an example of circuit forming a usual electromagnetic transponder.

Such a transponder is based on the use of an oscillating circuit 10, for example, parallel, formed of an inductive element forming an antenna and of a capacitive element C1 in parallel. This oscillating circuit is intended to detect a high-frequency electromagnetic field radiated by a terminal or reader (not shown). This type of system is intended to operate in near field communication, or near field inductive coupling, or NFC.

The transponders to which the embodiments which will be described apply are devices equipped with a battery 11 capable of powering the transponder circuits in certain operating modes. Such circuits have been schematically shown by a block 4 and comprise the different electronic circuits necessary for the use of the data received from the terminal and for the possible generation of transmissions in the transponder-to-terminal direction. The transponder power supply may also be extracted from the electromagnetic field radiated by the terminal having the transponder within its range. In this case, a rectifying bridge 2 having A.C. input terminals connected to terminals 12 and 13 of the oscillating circuit and having output terminals 21 and 22 respectively defining terminals of provision of a positive voltage and a terminal connected to a reference voltage, generally the ground, is used. In the example of FIG. 1, rectifying bridge 2, called power supply bridge, is a fullwave bridge comprising four diodes 24 to 27. A filtering and voltage step-down cell 23 is generally interposed between output 21 of rectifying bridge 2 and a terminal 31 for powering electronic circuits 4 internal to the transponder. Cell 23 for example is a pi-shaped filter comprising two capacitive elements C23 and C23' respectively grounding terminals 21 and 31, a resistor R23 being interposed between terminals 21 and 31. The excursion across the oscillating circuit may reach several tens of volts while the battery is intended to power circuits 4 with a voltage of a few volts. Cell 23 is thus used as a step-down transformer. Power supply terminal 31 receives a voltage originating either from cell 23 or from battery 11. In practice, a diode-type rectifying element D11 is interposed between the output of the battery and terminal 31 to avoid for a current to flow towards the battery.

Relating to data transmissions, the communications received from a terminal are interpreted by means of a demodulator 41 (DEMOD) comprised in block 4. This demodulator generally is an amplitude demodulator, transmissions in a terminal-to-transponder direction being performed in amplitude modulation of the radio frequency carrier generated by the terminal. Thus, a second rectifying bridge 5 is interposed between oscillating circuit 10 and an input 42 of demodulator 41. A.C. input terminals of rectifying bridge 5 are connected to terminals 12 and 13 of oscillating circuit 10 while its rectified output terminals 51 and 52 are respectively connected to terminal 42 and to the reference voltage. A filtering capacitive element C53 generally grounds terminal 42. Rectifying bridge 5, called demodulation bridge, for example is a fullwave bridge formed of 4 diodes 54 to 57.

The fact for the power supply of the transponder circuits to be drawn either from the battery or from the oscillating circuit according to the operating mode may be a problem, especially in the case where the battery charge is in a particular situation.

FIGS. 2A, 2B, 2C, and 2D illustrate this problem. These drawings are timing diagrams respectively illustrating, in their left-hand portion I, a battery-powered operation, in their central portion II, an operation where the transponder circuits are exclusively remotely supplied by a field detected by oscillating circuit 10, and in their right-hand portion III, a mixed operation capable of raising an issue.

FIG. 2A illustrates examples of the shape of signal $V_{RF}$ detected by the oscillating circuit, that is, the voltage between terminals 12 and 13. FIG. 2B illustrates examples of charge levels $V_{11}$ of the battery. FIG. 2C illustrates the corresponding shapes of voltage $V_{51}$ obtained at the output of demodulation bridge 5. FIG. 2D shows the resulting modulation index MI.

In the three situations, I, II, and III, it is assumed that the carrier transmitted by the terminal is amplitude-modulated with a modulation index of approximately 50%, that is, the level of voltage $V_{RF}$ for high states of the data signal is twice the level of the low states of this signal.

For simplification, the voltage drop in diode D11 is not taken into account. In practice, voltage $V_{11}$ shows the battery charge level minus the forward voltage drop in diode D11.

In portion I, level $V_{batI}$ of voltage $V_{11}$ is assumed to be greater than the voltage level extracted from the oscillating circuit and provided by cell 23. Block 4 is powered by the battery. Voltage $V_{51}$ reflects the 50% modulation rate between the two levels of the radio frequency signal. It can be considered that, since the transponder is powered by its battery, it only forms (at least in receive mode) a negligible load on the generated electromagnetic field. As a result (FIG. 2D), the modulation index is respected on the transponder side, thus reflecting the modulation of the electromagnetic field carrier.

In operating mode II, it is considered that the transponder is integrally remote-supplied. This for example corresponds to the absence of any battery ($V_{batII}=0$) or to a very discharged battery. In this case, all the power necessary to the operation of the electromagnetic circuit of the transponder is drawn from the electromagnetic field. The load then formed by the transponder on the field causes a modification (decrease) of the amplitude of signal $V_{RF}$. However, this decrease occurs in the same way for high-level periods and low-level periods of the modulation (see FIGS. 2A and 2C). Accordingly, the modulation index remains unmodified and approximately equal to 50%.

In operating mode III, battery 11 is partially discharged and is at a level $V_{batIII}$ intermediate between the high and low levels of the voltage extracted from the electromagnetic field. As a result, circuits 4 draw the power supply necessary for their operation from the electromagnetic field during high levels H (FIG. 2B) of the electromagnetic signal, and from the battery during low levels L of the modulation. With such a situation, voltage $V_{RF}$ across the oscillating circuit no longer respects a 50% modulation index. Accordingly, voltage $V_{51}$ recovered for the demodulator no longer has a 50% modulation index, but a lower index (FIG. 2D). In the shown example, the modulation index is assumed to have dropped to a value of 25%.

Such an instability of the modulation index may be prejudicial to the reliability of the data decoding since an amplitude demodulator generally operates with respect to thresholds. There thus are battery charge level situations where the demodulator is no longer capable of discriminating high states from low states of the signal modulating the carrier.

The example of a 50% modulation index is an arbitrary example. This line of argument transposes whatever the modulation index, since it will be altered anyway in certain battery charge situations.

It could have been devised to insert a switch between terminals 21 and 31, to disconnect rectifying bridge 2 when the battery is present and thus avoid altering the modulation index. However, the transponder circuits have a high power consumption and a large switch would thus be necessary to avoid too strong an increase of remote-supply mode losses. Further, the control of such a switch risks being a problem, since it would require a voltage of a level higher than that of the battery, or even higher than the highest level between the field level and the battery level (case of a P-channel MOS transistor, for example).

FIG. 3 is a simplified electric diagram of an embodiment of a transponder having, as a rectifying bridge for providing the power supply voltage, a bridge 2' controllable with a signal different from the voltage across the oscillating circuit (a diode bridge can indeed be considered as automatically controllable according to the voltage level extracted from the oscillating circuit), that is, having at least two of its rectifying elements comprising control terminals or electrodes. The other elements of the circuit of FIG. 3 are identical to those described in relation with FIG. 1. Since the rectifying elements must anyway be provided according to the required remote supply power, replacing them with switches adapted to this power is not a problem.

According to the embodiment of FIG. 3, it is provided to control (signal CTRL) controllable rectification elements of bridge 2' from the voltage level of battery 11. Bridge 2' may thus be only activated if the battery voltage level is not sufficient to guarantee a fully remote-supplied operation such as described in portion III of FIGS. 2A to 2D.

To simplify the representation of FIG. 3, the battery disconnection switch has not been illustrated. It may for example be a MOS transistor replacing diode D11 and having its parasitic diode used to block any current flow towards the battery when the transponder is powered from the electromagnetic field.

Figure 4:
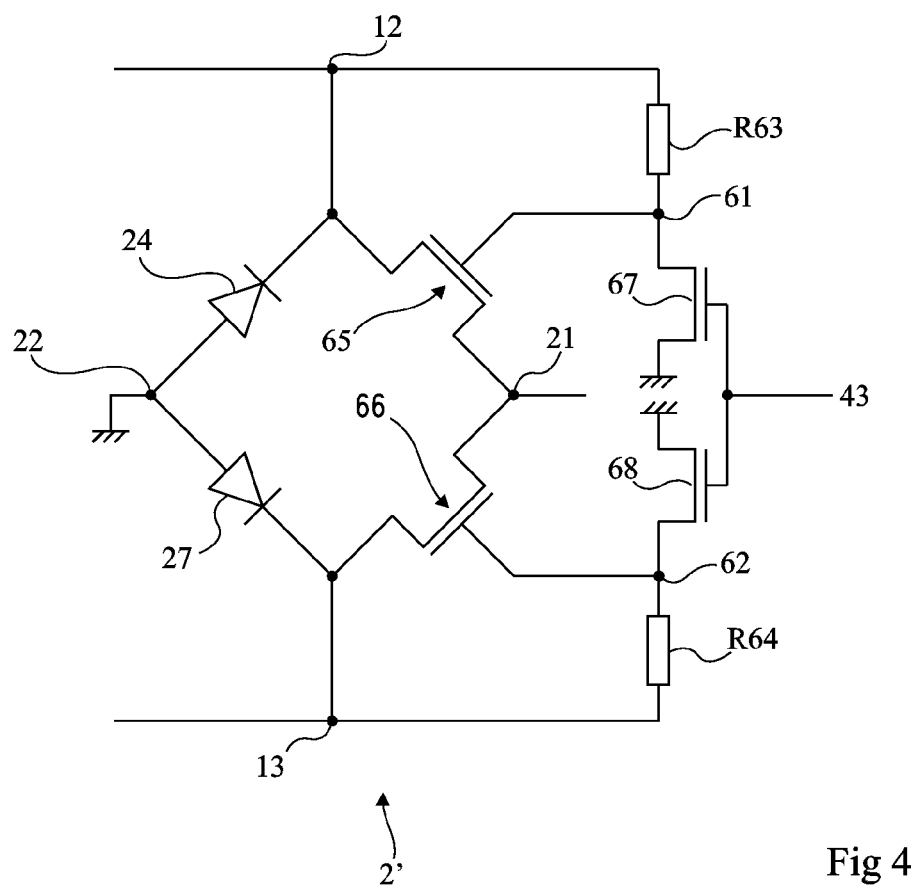
FIG. 4 shows a detail of the circuit of FIG. 3.

FIG. 4 shows a more detailed electric diagram of an embodiment of a controllable bridge 2'.

As compared with bridge 2 of FIG. 1, diodes 25 and 26 are replaced with MOS transistors 65 and 66. The control of these transistors is performed by connecting their respective gates to junction points 61 and 62 of series associations of resistors R63, respectively R64, and of MOS transistors 67, respectively 68, between respective A.C. input terminals 12 and 13 of bridge 2' and the reference potential (the ground). Transistors 67 and 68 have their gates interconnected, for example, to output terminal 43 of battery 11 or, as a variation, to a terminal of application of a voltage representative of the voltage across the battery.

Resistors R63 and R64 form resistive dividing bridges with the respective on-state drain-source resistors of transistors 67 and 68. This protects transistors 67 and 68, which can thus have a decreased size with respect to a switch having to withstand the remote-supply power and voltage.

When the battery voltage is sufficient, transistors 67 and 68 are turned on (N-channel transistors are assumed), which grounds the respective gates of transistors 65 and 66 and, accordingly, turns off (disconnects) rectifying bridge 2'. The power is then exclusively supplied by the battery. Conversely, when the battery voltage is lower than a threshold, transistors 67 and 68 are off. As a result, transistors 65 and 66 are non-conductive. In this case, this amounts to connecting their respective gates to terminals 12 and 13, which makes them diode-assembled. The rectifying bridge is then active.

The turn-on threshold of transistors 67 and 68 is set by the gate-source voltage to be applied thereto. In a simplified embodiment such as shown in FIG. 4, their gates are directly connected to the battery output (terminal 43). It is then considered that, when the battery is present, bridge 2' has to be disconnected, whatever the battery charge level.

Preferably, a voltage dividing bridge, for example, resistive, is interposed between a terminal (for example, 43) for providing the battery voltage level and the gates of transistors 67 and 68. A minimum battery charge level can thus be taken into account to disconnect the bridge. It will then be ascertained to select this threshold so that it is sufficiently low to avoid creating a new conflict between the remote-supply voltage and the battery voltage. The selection of this threshold depends on the demodulator sensitivity and on the power consumption of the transponder circuits.

The operation of the transponder described in relation with FIGS. 3 and 4 amounts, in the timing diagrams of FIGS. 2A to 2D, to only having situations I and II. Situation I corresponds to that where bridge 2' is disconnected.

Figure 5:
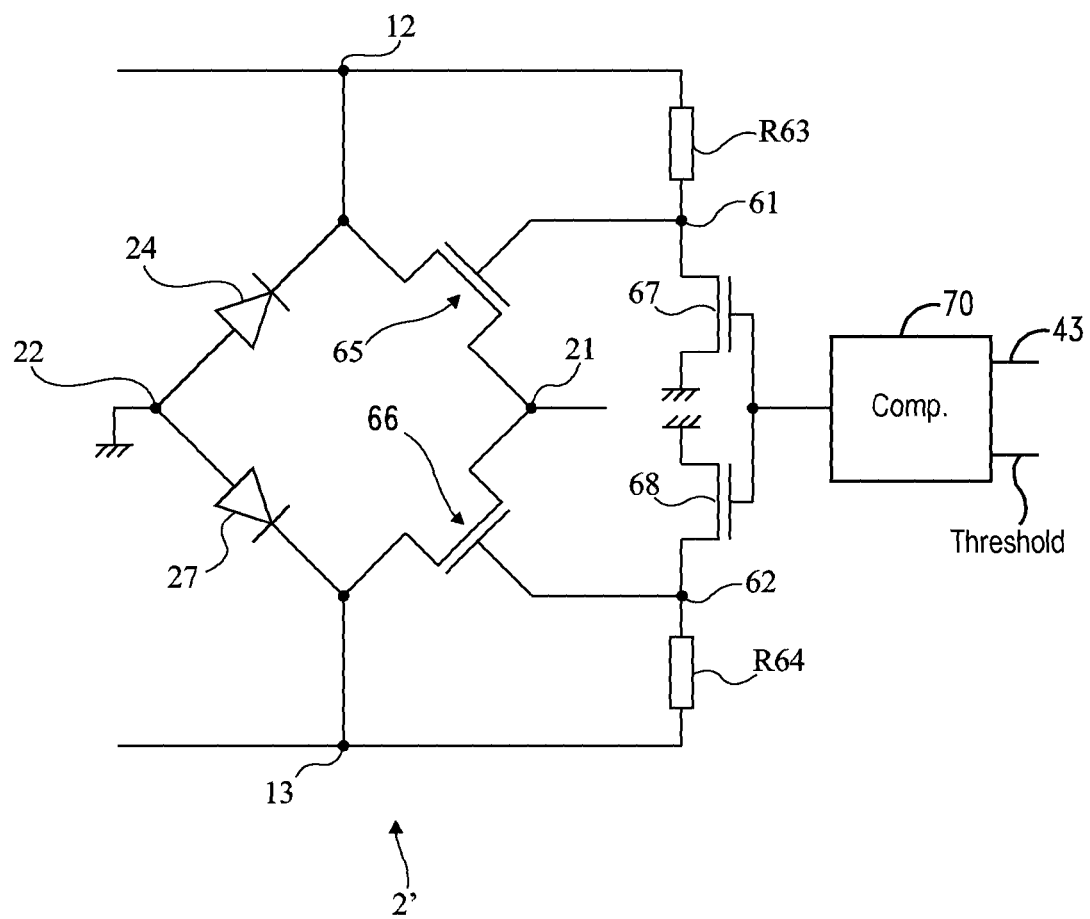
FIG. 5 shows an alternate embodiment of a detail of the circuit of FIG. 3

As an alternative to the circuit of FIG. 4, as shown in FIG. 5, a comparator 70 may be provided to compare the battery voltage level with a threshold and to accordingly control transistors 67 and 68. However, the embodiment of FIG. 4 is a preferred embodiment since it minimizes the number of necessary components.

An advantage of the provided control circuit is that transistors 67 and 68 are controllable with a signal having a relatively low voltage level as compared with the excursion of more than 10 volts that can be seen by transistors 65 and 66. It is then possible to provide it with a smaller size, which makes the integration easier. For example, the control voltage that they are to receive is compatible with the level of a few volts (in practice, less than 4 volts) of the battery.

Various embodiments have been described. Various alterations, modifications, and improvements will occur to those skilled in the art. In particular, it may be provided to control (to replace with transistors) diodes 24 and 27 instead of or in addition to the replacing of diodes 25 and 26. Further, the practical implementation of the described embodiments is within the abilities of those skilled in the art based on the function indications given hereinabove and by using current integrated circuit manufacturing technologies.

The invention claimed is:

1. An electromagnetic transponder comprising:
   an oscillating circuit;
   a first rectifying bridge having first and second alternating current (AC) input terminals connected across the oscillating circuit and having at least two controllable rectifying elements;
   a battery configured to provide an output voltage that controls the at least two controllable rectifying elements;
   a second rectifying bridge having first and second inputs and an output, the inputs being coupled across the oscillating circuit and
   an amplitude demodulator having an input coupled to the output of the second rectifying bridge.

2. The transponder of claim 1, wherein said at least two controllable rectifying elements include first and second MOS transistors.

3. The transponder of claim 2, wherein each of the first and second MOS transistors has a gate, the transponder further comprising:
   a first series association of a first resistive element and a third MOS transistor coupled between the first AC input terminal of the first rectifying bridge and a reference potential terminal; and
   a second series association of a second resistive element and a fourth MOS transistor coupled between the second AC input terminal of the first rectifying bridge and the reference potential terminal.

4. The transponder of claim 3, wherein each of the third and fourth MOS transistors has a gate that is configured to receive a voltage representative of a charge level of the battery.

5. The transponder of claim 4, wherein said battery is configured to supply the output voltage to the gates of the third and fourth MOS transistors as the voltage representative of the charge level of the battery.

6. The transponder of claim 1, further comprising a comparator configured to compare a level of the output voltage of the battery with a threshold and provide an output that controls the first rectifying bridge.

7. The transponder of claim 1, wherein said at least two controllable rectifying elements include first and second transistors, the transponder further comprising:
   a first series association of a first resistive element and a third transistor coupled between the first AC input terminal of the first rectifying bridge and a reference potential terminal; and a second series association of a second resistive element and a fourth transistor coupled between the second AC input terminal of the first rectifying bridge and the reference potential terminal.

8. An electromagnetic transponder comprising:
an oscillating circuit;
a first rectifying bridge having first and second alternating current (AC) input terminals connected across the oscillating circuit and having at least two controllable rectifying elements, wherein said at least two controllable rectifying elements include first and second transistors;
a battery configured to provide an output voltage that controls the at least two controllable rectifying elements;
a first series association of a first resistive element and a third transistor coupled between the first AC input terminal of the first rectifying bridge and a reference potential terminal; and
a second series association of a second resistive element and a fourth transistor coupled between the second AC input terminal of the first rectifying bridge and the reference potential terminal.

9. The transponder of claim 8, wherein each of the third and fourth transistors has a control terminal that is configured to receive a voltage representative of a charge level of the battery.

10. The transponder of claim 9, wherein said battery is configured to supply the output voltage to control terminals of the third and fourth transistors as the voltage representative of the charge level of the battery.

11. The transponder of claim 8, further comprising a comparator configured to compare a level of the output voltage of the battery with a threshold and provide an output that controls the first rectifying bridge.

12. The transponder of claim 8, wherein said first, second, third, and fourth transistors are MOS transistors.

13. The transponder of claim 8, wherein said first, second, third, and fourth transistors are MOS transistors.

14. An electromagnetic transponder comprising:
an oscillating circuit;
a first rectifying bridge having first and second alternating current (AC) input terminals connected across the oscillating circuit and having at least two controllable rectifying elements;
a battery configured to provide an output voltage that controls the at least two controllable rectifying elements; and
a comparator configured to compare a level of the output voltage of the battery with a threshold and provide an output that controls the first rectifying bridge.

15. The transponder of claim 14, wherein said at least two controllable rectifying elements include first and second transistors.

16. The transponder of claim 15, further comprising:
a third transistor coupled between the first AC input terminal of the first rectifying bridge and a reference potential terminal; and
a fourth transistor coupled between the second AC input terminal of the first rectifying bridge and the reference potential terminal.

17. The transponder of claim 16, wherein each of the third and fourth transistors has a control that is configured to receive a voltage representative of a charge level of the battery.

18. The transponder of claim 16, wherein said battery is configured to supply the output voltage to the gates of the third and fourth transistors as the voltage representative of the charge level of the battery.

* * * * *